US012794333B2

(12) United States Patent
Li et al.

(10) Patent No.: US 12,794,333 B2
(45) Date of Patent: Nov. 10, 2026

(54) LINEAR DRIVE MECHANISM

(71) Applicants: AAC Acoustic Technologies (Shanghai) Co., Ltd., Shanghai (CN); Beijing Xiaomi Robot Technology Co., Ltd., Beijing (CN)

(72) Inventors: Chunjiang Li, Shanghai (CN); Yuntong Li, Shanghai (CN); Bing Xie, Shanghai (CN); Chuiyou Zhou, Shanghai (CN); Liang Jiang, Shanghai (CN)

(73) Assignees: AAC Acoustic Technologies (Shanghai) Co., Ltd., Shanghai (CN); Beijing Xiaomi Robot Technology Co., Ltd., Beijing (CN)

( * ) Notice: Subject to any disclaimer, the term of this patent is extended or adjusted under 35 U.S.C. 154(b) by 223 days.

(21) Appl. No.: 18/744,587

(22) Filed: Jun. 14, 2024

(65) Prior Publication Data

US 2025/0317041 A1 Oct. 9, 2025

Related U.S. Application Data

(63) Continuation of application No. PCT/CN2024/089028, filed on Apr. 22, 2024.

(30) Foreign Application Priority Data

Apr. 8, 2024 (CN) ......................... 202410414961.0

(51) Int. Cl.
*H02K 41/02* (2006.01)
*H02K 1/16* (2006.01)
(Continued)

(52) U.S. Cl.
CPC ............... *H02K 41/02* (2013.01); *H02K 1/16* (2013.01); *H02K 1/2706* (2013.01); *H02K 11/215* (2016.01)

(58) Field of Classification Search
CPC ...... H02K 41/02; H02K 11/21; H02K 11/215; H02K 7/06; F16H 25/22; F16H 25/20
See application file for complete search history.

(56) References Cited

U.S. PATENT DOCUMENTS 5,689,994 A * 11/1997 Nagai ...................... B23Q 5/38 74/89.32
2016/0294253 A1* 10/2016 Fukunaga .............. H02K 7/083
(Continued)

FOREIGN PATENT DOCUMENTS

CN 107127749 A * 9/2017 .............. B25J 17/00

OTHER PUBLICATIONS

CN-107127749-A Machine Translation (Year: 2017).*

*Primary Examiner* — Oluseye Iwarere
*Assistant Examiner* — Masoud Vaziri
(74) *Attorney, Agent, or Firm* — Wiersch Law Group

(57) ABSTRACT

The present application provides a linear drive mechanism, including a casing with openings at both ends, a front cover and a rear cover fixed at opposite ends of the casing, a stator arranged in the casing, a hollow rotor arranged in the stator and rotatably connected to the stator, a roller screw arranged in the rotor. The roller screw includes a screw nut fixed in the rotor and a center screw arranged on an inner peripheral side of the screw nut and arranged through the front cover, and the screw nut is rotatably connected to the center screw. The stator drives the rotor to rotate the screw nut, to drive the center screw to perform a linear telescopic motion. The linear drive mechanism of the present application has a good linear drive effect, good real-time controllability, high efficiency of multi-stage transmission, high reliability, and saves mounting space.

13 Claims, 5 Drawing Sheets

(51) Int. Cl.
*H02K 1/2706* (2022.01)
*H02K 11/215* (2016.01)

(56) References Cited

U.S. PATENT DOCUMENTS

| | | | | |
|---|---|---|---|---|
| 2019/0277373 | A1* | 9/2019 | Matsuto | F16H 35/10 |
| 2023/0137763 | A1* | 5/2023 | Fedosovskiy | H02K 7/08 310/12.19 |

* cited by examiner

A-A

B-B

LINEAR DRIVE MECHANISM

CROSS-REFERENCE TO RELATED APPLICATIONS

This application is a continuation of International Application No. PCT/CN2024/089028, filed on Apr. 22, 2024, which claims priority to Chinese patent application No. 202410414961.0, filed on Apr. 8, 2024. The entire contents of these applications are incorporated herein by reference in their entirety.

TECHNICAL FIELD

The present application relates to the technical field of linear drive, in particular to a linear drive mechanism.

BACKGROUND

Currently, with the rapid development of artificial intelligence and robotics industry, the fingers of humanoid robots are crucial for executing actions and completing tasks. However, due to constraints such as space and energy efficiency, more stringent requirements are placed on their linear actuators, so linear actuators need to evolve towards higher integration, smaller size, higher load-bearing capacity, and faster response. The linear drive mechanism is a kind of linear actuator, adopting the screw as the active part and the nut as the linear output, i.e., the nut does not rotate but does telescopic operation along the direction of the axis, and the screw rotates in the way of operation.

In the related art, linear actuators mainly employ brushed motors and multi-stage planetary gear structures. The force transmission of the brushed motor undergoes significant hysteresis after multiple stages of reduction, leading to poor real-time control performance. Additionally, the efficiency decreases rapidly with an increase in the number of stages in the transmission. Moreover, brushed motors themselves suffer from reliability issues, such as unbalanced three-phase resistance and torque due to contact problems with brushes. Besides, for the safety of the system, the casing must be set up to constrain the outer diameter of the motor stator and the outer part of the nut into an integral casing, which increases the overall size of the linear actuator.

Therefore, it is necessary to provide a new linear drive mechanism to solve the above technical problems.

SUMMARY

An object of the present application is to provide a linear drive mechanism with a good linear drive effect, good real-time control performance, high efficiency of multi-stage transmission, high reliability, and saving mounting space.

In order to achieve the above purpose, the present application provides a linear drive mechanism comprising:

- a casing with openings at both ends;
- a front cover and a rear cover fixed at opposite ends of the casing;
- a stator arranged in the casing;
- a hollow rotor arranged in the stator and rotatably connected to the stator; and
- a roller screw arranged in the rotor, comprising:
  - a screw nut fixed in the rotor; and
  - a center screw arranged on an inner peripheral side of the screw nut and arranged through the front cover; wherein the screw nut is rotatably connected to the casing and the center screw;
- wherein the stator is configured to drive the rotor to rotate the screw nut, to drive the center screw to perform a linear telescopic motion.

In one embodiment, the screw nut comprises a hollow nut body fixed in the rotor and a first threaded structure formed on an inner peripheral side of the nut body;

- the center screw comprises a center screw body arranged within the nut body and provided with a second threaded structure on its outer peripheral side, and an extending end formed by an extension of an end of the center screw body close to the front cover; the first threaded structure is screwed to the second threaded structure, and an end of the extending end close to the front cover is arranged through the front cover.

In one embodiment, the linear drive mechanism further comprises a rectangular stopper, wherein the stopper is fixedly sleeved on the extending end and abutted against the center screw body; the extending end where the stopper is located forms a slidable connection with the front cover and moves in an axial direction of the center screw body.

In one embodiment, the linear drive mechanism further comprises a control board and a linear position sensor, wherein the control board is fixed to the casing and the front cover, and the linear position sensor is electrically connected to the control board and configured to collect linear movement data of the stopper.

In one embodiment, a control board and a linear position sensor, wherein the control board is fixed to the casing and the front cover, and the linear position sensor is electrically connected to the control board and configured to collect linear movement data of the stopper.

In one embodiment, the linear position sensor comprises an elastic piece fixed to a side of the stopper close to the control board and elongated conductor resistances fixed to a side of the control board close to the center screw; wherein the elastic piece is slidable with the stopper on a surface of the conductor resistance, and a linear extending length of the extending end is collected by the conductor resistances at different positions.

In one embodiment, the stator comprises a stator core fixed on a side of the casing close to the roller screw and a coil winding fixed in the stator core, wherein the coil winding is spaced apart from the rotor, and the coil winding is configured to drive the rotor to rotate after being energized.

In one embodiment, the rotor is of a magnet-conducting hollow shaft structure, and a permanent magnet mounted on the magnet-conducting hollow shaft structure is of a radial four-pole magnetic ring structure or a radial six-pole magnetic ring structure.

In one embodiment, the rotor is of a magnet-conducting hollow shaft structure; a permanent magnet mounted on the magnet-conducting hollow shaft structure is of a magnetic sheet structure, and the magnetic sheet structure is bonded to the magnet-conducting hollow shaft structure to form a radial four-pole magnetic field or a six-pole magnetic field.

In one embodiment, the linear drive mechanism further comprises an angular position sensor, wherein the angular position sensor comprises a collecting portion fixed to the rear cover and a rotating portion fixed to a side of the screw nut close to the rear cover, and the collecting portion and the rotating portion are provided opposite and spaced apart.

In one embodiment, there are two Hall sensor chips in the angular position sensor, wherein the two Hall sensor chips are located at one end of the control board away from the linear drive mechanism and in a radial direction of the rotor, and the angular position of the rotor is identified by sensing an angular phase signal of a magnetic field of a rotor magnet.

In one embodiment, the linear drive mechanism further comprises a first bearing and a second bearing, wherein the first bearing and the second bearing are fixedly sleeved on the two ends of the screw nut, respectively, and an outer peripheral side of the first bearing and an outer peripheral side of the second bearing are fixed in the casing.

In one embodiment, the casing is of a structure with openings at both ends; and the casing, the front cover, and the rear cover are connected into a single unit by bolts.

In one embodiment, the casing comprises a front section casing and a rear section casing; the rear section casing is fused into the rear cover as a single unit; and the front cover, the front section casing, and the rear cover fusing the rear section casing are connected into a single unit by bolts.

Compared to the related art, in the linear drive mechanism of the present application, a roller screw is arranged in a rotor, and the roller screw includes a screw nut fixed in the rotor and a center screw arranged on an inner peripheral side of the screw nut and arranged through the front cover, and the screw nut is rotatably connected to the center screw. The stator is configured to drive the rotor to rotate the screw nut, to drive the center screw to perform a linear telescopic motion. This enables direct drive between the motor and the motion mechanism, making it easy to control with high system reliability. It has a low overall height, short length, and mounting-friendly dimensions. Additionally, it reduces costs and saves mounting space.

BRIEF DESCRIPTION OF THE DRAWINGS

In order to more clearly illustrate the technical solutions in the embodiments of the present application, the accompanying drawings to be used in the description of the embodiments will be briefly introduced below. Obviously, the accompanying drawings in the following description are only some embodiments of the present application, and for the person of ordinary skill in the field, other accompanying drawings can be obtained based on these drawings without putting in creative labor.

In the figures, 100, linear drive mechanism; 1, casing; 2, front cover; 3, rear cover; 4, stator; 41, stator core; 42, coil winding; 5, rotor; 6, roller screw; 61, screw nut; 611, nut body; 612, first threaded structure; 62, center screw; 621, center screw body; 622, second threaded structure; 623, extending end; 7, stopper; 71, stopper body; 72, groove; 8, control board; 9, linear position sensor; 91, linear sensor magnet; 92, Hall sensor; 93, elastic piece; 94, conductor resistance; 10, angular position sensor; 101, rotating portion; 102, collecting portion; 11, first bearing; 12, second bearing; and 13, magnet holder.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application and not all of the embodiments. Based on the embodiments in the present application, all other embodiments obtained by a person of ordinary skill in the art without making creative labor fall within the protection scope of the present application.

Embodiment One

Figure 1:
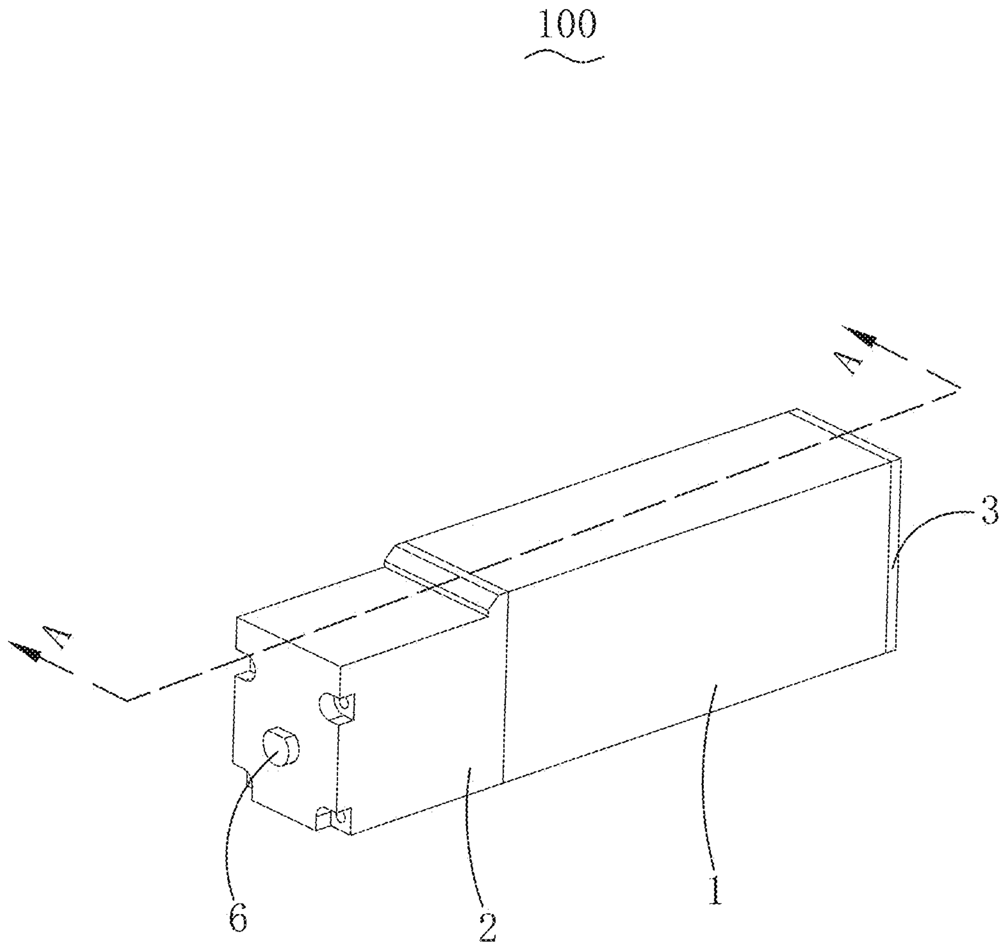
FIG. 1 shows a three-dimensional structural schematic diagram of a linear drive mechanism according to Embodiment One of the present application.
Figure 2:
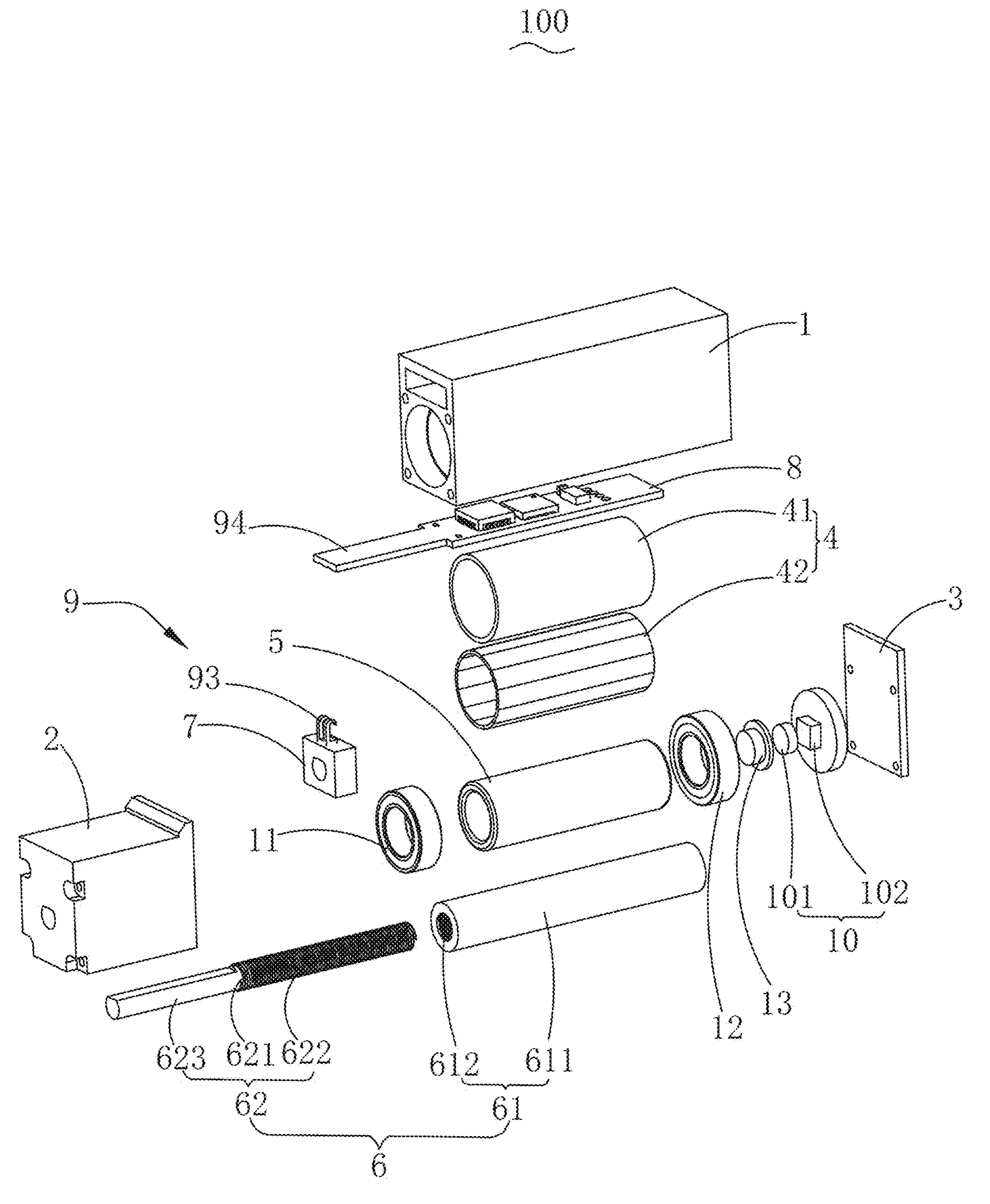
FIG. 2 shows a three-dimensional structural exploded view of the linear drive mechanism according to Embodiment One of the present application.
Figure 3:
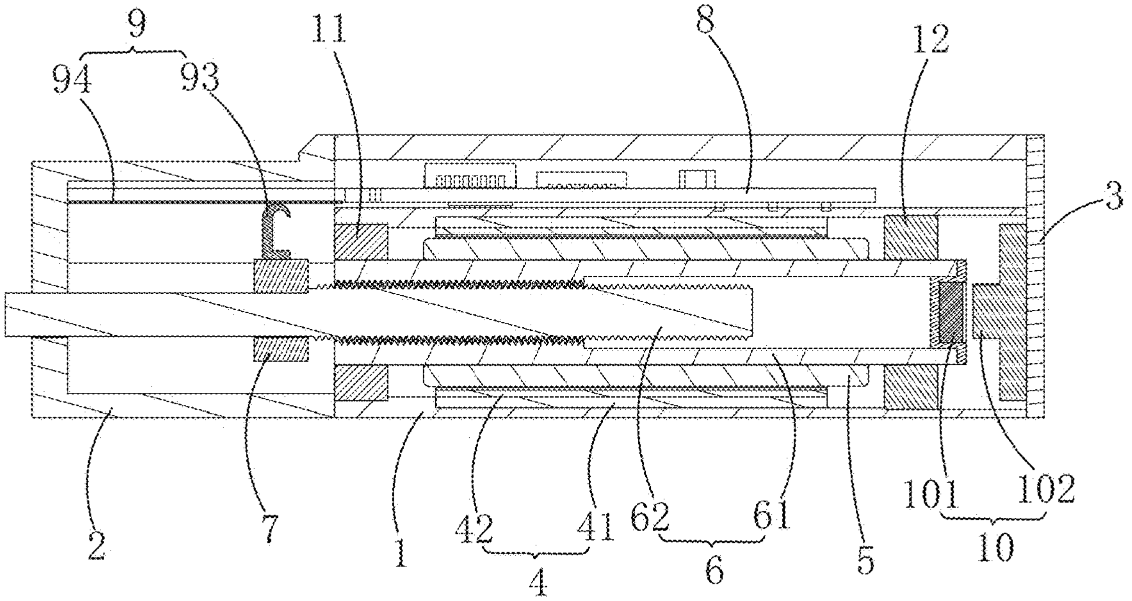
FIG. 3 shows a sectional view along line A-A of FIG. 1.
Figure 4:
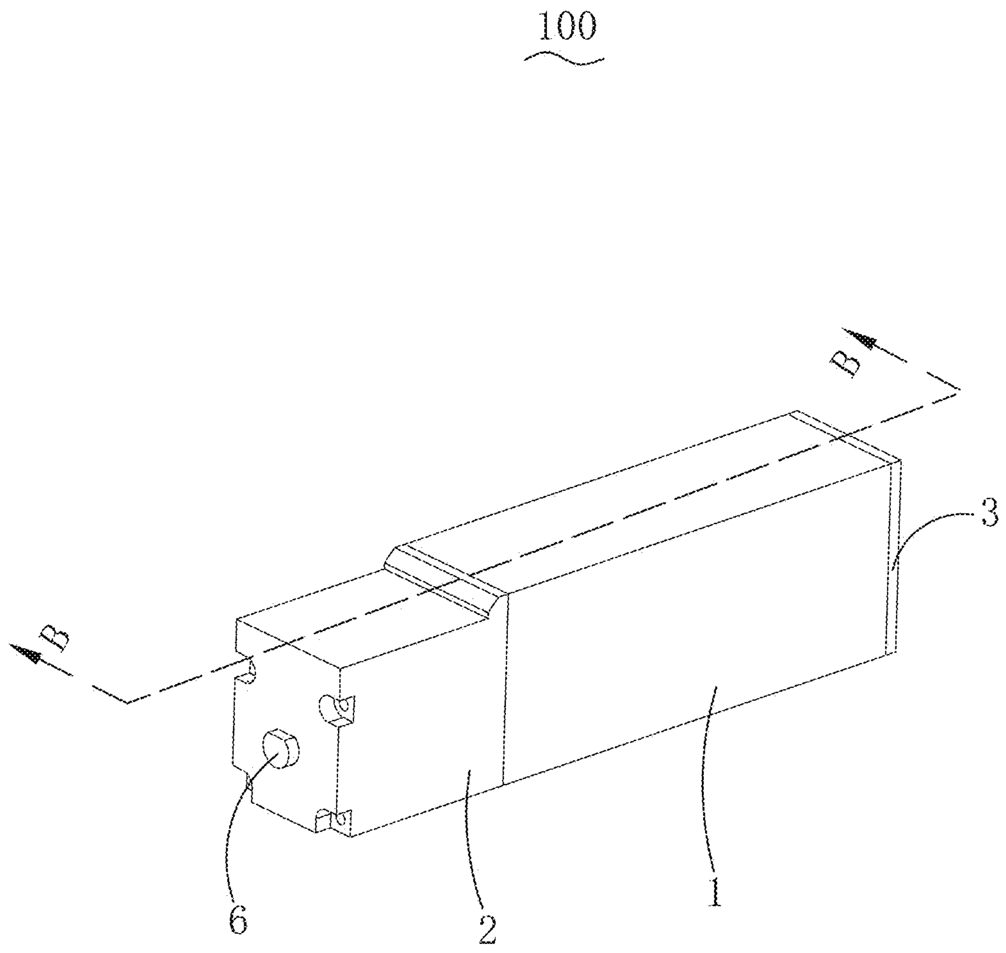
FIG. 4 is a three-dimensional structural schematic diagram of the linear driving mechanism according to Embodiment Two of the present application.
Figure 5:
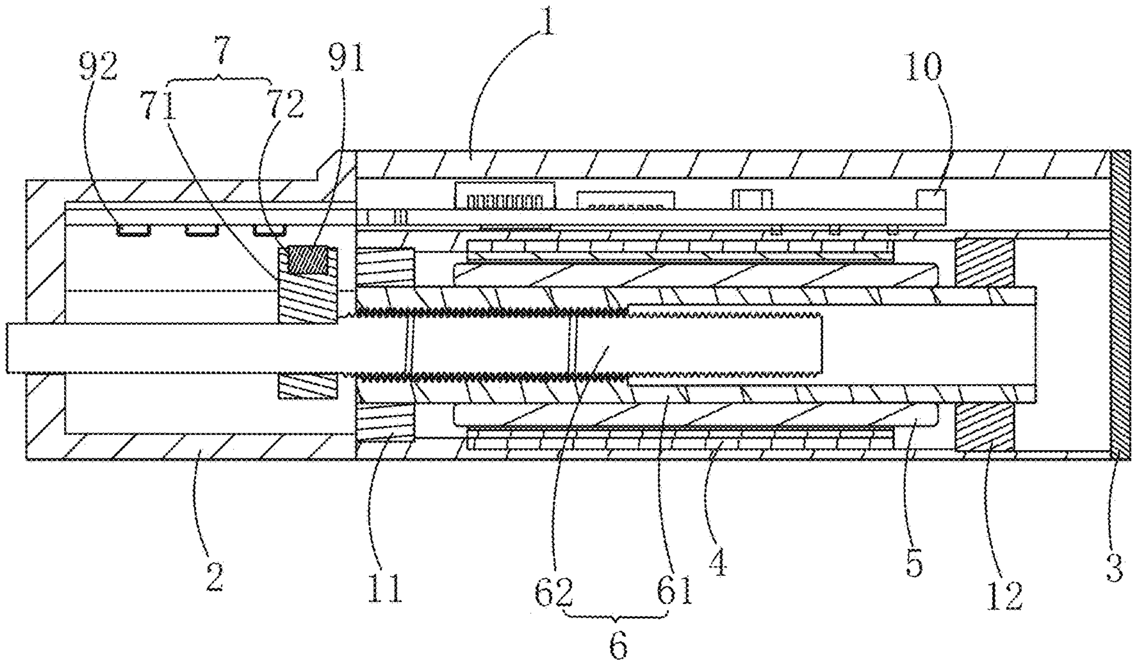
FIG. 5 is a sectional view along line B-B of FIG. 4.

As shown in FIGS. 1 to 3, an embodiment of the present application provides a linear drive mechanism 100, including a casing 1 with openings at both ends, a front cover 2 and a rear cover 3 fixed at opposite ends of the casing 1, a stator 4 arranged in the casing 1, and a hollow rotor 5 arranged in the stator 4 and rotatably connected to the stator 4. The linear drive mechanism 100 further includes a roller screw 6 arranged in the rotor 5.

The four corners of the front cover 2, the casing 1, and the rear cover 3 are all provided with four round holes. The front cover 2, the casing 1, and the rear cover 3 are connected in series by four long bolts to realize a fixed connection. The long bolt connection is easy to disassemble.

The roller screw 6 includes a screw nut 61 fixed in the rotor 5 and a center screw 62 arranged on the inner peripheral side of the screw nut 61 and arranged through the front cover 2. The screw nut 61 is rotatably connected to the center screw 62. The stator 4 drives the rotor 5 to drive the screw nut 61 to rotate, so as to drive the center screw 62 to perform a linear telescopic movement. This enables direct drive between the motor and the motion mechanism, making it easy to control with high system reliability. It has a low overall height, short length, and mounting-friendly dimensions. Additionally, it reduces costs and saves installation space.

In this embodiment, the screw nut 61 includes a hollow nut body 611 fixed in the rotor 5 and a first threaded structure 612 formed on the inner peripheral side of the nut body 611. The center screw 62 includes a center screw body 621 arranged in the nut body 611 and provided with a second threaded structure 622 on its outer peripheral side, and an extending end 623 formed by an extension of an end of the center screw body 621 close to the front cover 2. The first threaded structure 612 is screwed to the second threaded structure 622, and an end of the extending end 623 close to the front cover 2 is arranged through the front cover 2. The screw nut 61 is driven to rotate by the rotation of the rotor 5, and the first threaded structure 612 and the second threaded structure 622 are screwed together so that the center screw 62 is driven to realize linear telescopic motion in the process of the rotation of the screw nut 61.

In an embodiment, the extending end 623 and the center screw body 621 form a T-type screw structure, and the rotor 5 directly drives the T-type screw, which is highly efficient and structurally simple. Besides, the T-type screw has a certain locking force, which is not easy to fall off.

In this embodiment, the linear drive mechanism 100 further includes a rectangular stopper 7. The stopper 7 is fixed to the extending end 623 and abutted against the center screw body 621, and the extending end 623 where the stopper 7 is located forms a sliding connection with the front cover 2 and moving in an axial direction of the center screw body 621.

In an embodiment, a side of the front cover 2 close to the center screw body 621 is provided with a sliding bearing, the sliding bearing forms a sliding connection with the extending end 623, which facilitates an improved sliding effect.

In this embodiment, the linear drive mechanism 100 further includes a control board 8 and a linear position sensor 9. The control board 8 is fixed to the casing 1 and the front cover 2, the linear position sensor 9 is electrically connected to the control board 8, and the linear position sensor 9 is configured to collect the linear movement data of the stopper 7. In an embodiment, the control board 8 is a Printed Circuit Board (PCB).

In this embodiment, the linear position sensor 9 includes an elastic piece 93 fixed to a side of the stopper 7 close to the control board 8 and an elongated conductor resistance 94 fixed to a side of the control board 8 close to the center screw 62. The elastic piece 93 is slidable with the stopper 7 on the surface of the conductor resistance 94, and a linear extending length of the extending end is collected by the conductor resistances at different positions.

In this embodiment, the stator 4 includes a stator core 41 fixed on a side of the casing 1 close to the roller screw 6 and a coil winding 42 fixed in the stator core 41. The coil winding 42 is spaced apart from the rotor 5, and the coil winding 42 is configured to drive the rotor 5 to rotate after being energized.

In an embodiment, the stator core 41 is an annular magnetic-conducting steel sleeve. The stator core 41 is a silicon steel sheet stacked and bonded into a circular shape. The stator core 41 is a silicon steel sheet stacked and riveted into a circular shape.

The stator 4 is of a toothless groove structure, and the motor has toothless groove torque, which makes the motor jitter small when speed regulation. The motor driving force is smooth, the thrust is stable within the required driving length, the fluctuation is small, and the driving control is simple.

In this embodiment, the coil winding 42 is a coil ring with both ends open formed by six coils stacked and bonded.

In this embodiment, the rotor 5 is of a magnetic-conducting hollow shaft structure, and a permanent magnet mounted on the magnetic-conducting hollow shaft structure is of a radial four-pole magnetic ring structure or a six-pole magnetic ring structure. The rotor 5 is a permanent magnet ring structure with a simple structure, no brush friction, and a fast dynamic response.

In this embodiment, the rotor 5 is of a magnetic-conducting hollow shaft structure, and a permanent magnet mounted on the magnetic-conducting hollow shaft structure is of a magnetic sheet structure. The magnetic sheet structure is bonded to the magnetic-conducting hollow shaft structure to form a radial four-pole magnetic field or a radial six-pole magnetic field.

In this embodiment, the material of the rotor 5 is neodymium-iron-boron having a performance grade greater than or equal to N45H.

In this embodiment, the linear drive mechanism 100 further includes an angular position sensor 10, which includes a collecting section 102 fixed to the rear cover 3 and a rotating section 101 fixed to an end of the screw nut 61 close to the rear cover 3. The collecting section 102 is spaced apart from the rotating section 101, and the angular position sensor 10 is configured to provide angular information for motor control.

In this embodiment, there are two Hall sensor chips of the angular position sensor 10. The two Hall sensor chips are located at an end of the control board away from the direction of the linear drive mechanism 100 and in the radial direction of the rotor 5, so as to recognize the angular position of the motor by sensing the angular phase signals of the magnetic field of the rotor magnet.

In this embodiment, the linear drive mechanism 100 further includes a magnet holder 13. The magnet holder 13 is fixed to an end of the screw nut 61 close to the rear cover 3, and the rotating portion 101 is fixed in the magnet holder 13.

In this embodiment, the linear drive mechanism 100 further includes a first bearing 11 and a second bearing 12. The first bearing 11 and the second bearing 12 are fixedly sleeved on both ends of the screw nut 61, respectively. An outer peripheral side of the first bearing 11 and an outer peripheral side of the second bearing 12 are fixed in the casing 1.

In an embodiment, the first bearing 11 and the second bearing 12 are both roller bearings.

In this embodiment, the casing 1 is of a structure with openings at both ends, and the casing 1, the front cover 2, and the rear cover 3 are connected into a single unit by bolts.

In this embodiment, the casing 1 includes a front section casing and a rear section casing. The rear section casing is fused into the rear cover 3 as a single unit, and the front cover 2, the front section casing, and the rear cover 3 fusing the rear section casing are connected into a single unit by bolts.

Embodiment Two

As shown in FIGS. 1 to 5, Embodiment Two has the same basic structure and produces the same technical effect as Embodiment One. The differences are that, in this embodiment, the linear position sensor 9 includes a linear sensor magnet 91 embedded in a side of the stopper 7 close to the control board 8 and at least one Hall sensor 92 fixed to a side of the control board 8 close to the center screw 62. The Hall sensor 92 is located within the magnetic field of the linear sensor magnet 91.

The stopper 7 includes a stopper body 71 sleeved on the extending end 623 and a groove 72 formed by the stopper body 71 recessing from a side of the stopper body 71 close to the control board 8 to a side away from the control board 8. The linear sensor magnet 91 is fixed in the groove 72.

In an embodiment, the linear sensor magnet 91 may be directly bonded to the extending end 623 and located in the original position of the stopper 7, thereby saving costs.

In this embodiment, the angular position sensor 10 is fixed to the control board 8.

In this embodiment, by applying the linear drive mechanism 100 to an electrically driven linear actuator for robotic dexterous fingers or joints, the integration is high and the process is simplified.

Compared to the related art, in the linear drive mechanism of the present application, a roller screw is arranged in a rotor, and the roller screw includes a screw nut fixed in the rotor and a center screw arranged on an inner peripheral side of the screw nut and arranged through the front cover, and the screw nut is rotatably connected to the center screw. The stator is configured to drive the rotor to rotate the screw nut, to drive the center screw to perform a linear telescopic motion. This enables direct drive between the motor and the motion mechanism, making it easy to control with high system reliability. It has a low overall height, short length, and mounting-friendly dimensions. Additionally, it reduces costs and saves mounting space.

Described above are only some embodiments of the present application, and it should be noted herein that, for those of ordinary skill in the art, improvements may be made without departing from the inventive concept of the present application, but these all fall within the protection scope of the present application.

What is claimed is:

1. A linear drive mechanism, comprising:

a casing with openings at both ends;

a front cover and a rear cover fixed at opposite ends of the casing;

a stator arranged in the casing;

a hollow rotor arranged in the stator and rotatably connected to the stator;

a rectangular stopper; and a roller screw arranged in the rotor, comprising:

a screw nut fixed in the rotor; and a center screw arranged on an inner peripheral side of the screw nut and arranged through the front cover; wherein the screw nut is rotatably connected to the casing and the center screw;

wherein the stator is configured to drive the rotor to rotate the screw nut, to drive the center screw to perform a linear telescopic motion wherein the screw nut comprises a hollow nut body fixed in the rotor and a first threaded structure formed on an inner peripheral side of the nut body;

the center screw comprises a center screw body arranged within the nut body and provided with a second threaded structure on its outer peripheral side, and an extending end formed by an extension of an end of the center screw body close to the front cover; the first threaded structure is screwed to the second threaded structure, and an end of the extending end close to the front cover is arranged through the front cover;

wherein the stopper is fixedly sleeved on the extending end and abutted against the center screw body; the extending end where the stopper is located forms a slidable connection with the front cover and moves in an axial direction of the center screw body.

2. The linear drive mechanism of claim 1, further comprising a control board and a linear position sensor, wherein the control board is fixed to the casing and the front cover, and the linear position sensor is electrically connected to the control board and configured to collect linear movement data of the stopper.

3. The linear drive mechanism of claim 2, wherein the linear position sensor comprises a linear sensor magnet embedded in a side of the stopper close to the control board and at least one Hall sensor fixed to a side of the control board close to the center screw, wherein the at least one Hall sensor is located within a magnetic field of the linear sensor magnet.

4. The linear drive mechanism of claim 2, wherein the linear position sensor comprises an elastic piece fixed to a side of the stopper close to the control board and elongated conductor resistances fixed to a side of the control board close to the center screw; wherein the elastic piece is slidable with the stopper on a surface of the conductor resistance, and a linear extending length of the extending end is collected by the conductor resistances at different positions.

5. The linear drive mechanism of claim 2, further comprises an angular position sensor, wherein the angular position sensor comprises a collecting portion fixed to the rear cover and a rotating portion fixed to a side of the screw nut close to the rear cover, and the collecting portion and the rotating portion are provided opposite and spaced apart.

6. The linear drive mechanism of claim 5, wherein there are two Hall sensor chips in the angular position sensor, wherein the two Hall sensor chips are located at one end of the control board away from the linear drive mechanism and in a radial direction of the rotor, and the angular position of the rotor is identified by sensing an angular phase signal of a magnetic field of a rotor magnet.

7. The linear drive mechanism of claim 1, wherein the stator comprises a stator core fixed on a side of the casing close to the roller screw and a coil winding fixed in the stator core, wherein the coil winding is spaced apart from the rotor, and the coil winding is configured to drive the rotor to rotate after being energized.

8. The linear drive mechanism of claim 1, wherein the rotor is of a magnet-conducting hollow shaft structure, and a permanent magnet mounted on the magnet-conducting hollow shaft structure is of a radial four-pole magnetic ring structure or a radial six-pole magnetic ring structure.

9. The linear drive mechanism of claim 1, wherein the rotor is of a magnet-conducting hollow shaft structure; a permanent magnet mounted on the magnet-conducting hollow shaft structure is of a magnetic sheet structure, and the magnetic sheet structure is bonded to the magnet-conducting hollow shaft structure to form a radial four-pole magnetic field or a six-pole magnetic field.

10. The linear drive mechanism of claim 1, further comprising a first bearing and a second bearing, wherein the first bearing and the second bearing are fixedly sleeved on the two ends of the screw nut, respectively, and an outer peripheral side of the first bearing and an outer peripheral side of the second bearing are fixed in the casing.

11. The linear drive mechanism of claim 1, wherein the casing is of a structure with openings at both ends; and the casing, the front cover, and the rear cover are connected into a single unit by bolts.

12. The linear drive mechanism of claim 1, wherein the casing comprises a front section casing and a rear section casing; the rear section casing is fused into the rear cover as a single unit; and the front cover, the front section casing, and the rear cover fusing the rear section casing are connected into a single unit by bolts.

13. A robot, comprising limb joints and the linear drive mechanism as described in claim 1 applied to the limb joints.

* * * * *